United States Patent
Kojima et al.

(10) Patent No.: US 7,963,496 B2
(45) Date of Patent: *Jun. 21, 2011

(54) VEHICLE SEAT SLIDING APPARATUS

(75) Inventors: Yasuhiro Kojima, West Bloomfield, MI (US); Hideo Nihonmatsu, Anjo (JP); Ryousuke Mizuno, Toyota (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 66 days.

This patent is subject to a terminal disclaimer.

(21) Appl. No.: 12/568,919

(22) Filed: Sep. 29, 2009

(65) Prior Publication Data

US 2010/0090080 A1 Apr. 15, 2010

(30) Foreign Application Priority Data

Oct. 15, 2008 (JP) ................................. 2008-266640

(51) Int. Cl.
*F16M 13/00* (2006.01)
*A47C 1/00* (2006.01)
*B62D 27/00* (2006.01)

(52) U.S. Cl. ..................... 248/429; 297/341; 296/65.13; 296/65.14

(58) Field of Classification Search .................. 248/429, 248/430; 297/341; 296/65.13, 65.14
See application file for complete search history.

(56) References Cited

U.S. PATENT DOCUMENTS

| 4,568,054 A | 2/1986 | Degremont |
| 5,775,662 A * | 7/1998 | Hoshihara et al. ............. 248/429 |
| 2008/0048476 A1 * | 2/2008 | Kojima et al. ................ 297/341 |

FOREIGN PATENT DOCUMENTS

| JP | 59-2938 | 1/1984 |
| JP | 3646356 | 2/2005 |

OTHER PUBLICATIONS

U.S. Appl. No. 12/726,625, filed Mar. 18, 2010, Moriyama et al.
U.S. Appl. No. 12/569,301, filed Sep. 29, 2009, Kojima et al.
U.S. Appl. No. 12/569,372, filed Sep. 29, 2009, Kojima et al.

* cited by examiner

*Primary Examiner* — Terrell Mckinnon
*Assistant Examiner* — Erin Smith
(74) *Attorney, Agent, or Firm* — Oblon, Spivak, McClelland, Maier & Neustadt, L.L.P.

(57) ABSTRACT

In a vehicle seat sliding apparatus wherein rotating an operating lever causes a lock lever to allow a sliding movement of an upper rail along a lower rail, the operating lever is held within a bracket connected to the upper rail via torsion spring. The torsion spring is made from a single piece of wire and formed into a specific shape for easy provision of the operating lever to the bracket during an assembly of the seat sliding apparatus.

5 Claims, 4 Drawing Sheets

WIDTHWISE DIRECTION

VEHICLE SEAT SLIDING APPARATUS

CROSS REFERENCE TO RELATED APPLICATION

This application is based on and claims priority under 35 U.S.C Section 119 to Japanese Patent Application No. 2008.266640 filed on Oct. 15, 2008, the entire content of which is incorporated herein by reference.

BACKGROUND OF THE INVENTION

1. Field of the Invention

The present invention relates to a vehicle seat sliding apparatus.

2. Description of the Related Art

In the related art, various types of vehicle seat sliding apparatuses are proposed (for example, Japanese Patent No. 3646356, Japanese Patent No. 3449227, Japanese Patent No. 3647502, JP-A-59-2938). These apparatuses each include a lower rail and an upper rail connected to the lower rail so as to be movable with respect to the lower rail. Then, a lock lever adapted to engage the lower rail and selectively restrict the movement of the upper rail with respect to the lower rail is rotatably connected to the upper rail. The upper rail is also provided with an operating lever which is capable of transmitting an operating force to release the movement restriction with respect to the lock lever, and a torsion spring adapted to resiliently hold the operating lever.

Incidentally, the vehicle seat sliding apparatuses in Japanese Patent No. 3646356, Japanese Patent No. 3449227, and Japanese Patent No. 3647502 are all configured to assemble the torsion spring to a lever (lock lever or the like) movable (rotatable) with respect to the upper rail, and hence the assembly work of the torsion spring becomes complicated. Then, a rod-shaped or a pipe-shaped operating lever has a configuration to be connected to the lever including the torsion spring assembled thereto in a state of being engaged with the torsion spring, and hence the assembly work of the operation lever also becomes complicated. In particular, in Japanese Patent No. 3646356 and Japanese Patent No. 3647502, the operating lever is connected so as to rotate integrally with the lock lever and, when the direction of rotation of the operating lever and the direction of rotation of the lock lever differ from each other, for example, an axis of rotation cannot be used commonly, so that the number of components and the number of steps of assembly are increased.

SUMMARY OF THE INVENTION

Thus, a need exists for a seat sliding apparatus which is not susceptible to the drawback mentioned above.

In order to solve the drawback mentioned above, a first aspect of the invention provides a vehicle seat sliding apparatus having a lower rail adapted to be fixed to a vehicle-floor, and an upper rail adapted to be fixed to a seat cushion and connected to the lower rail so as to be movable with respect to the lower rail, a lock lever rotatably connected to the upper rail and adapted to engage the lower rail to selectively restrict the movement of the upper rail with respect to the lower rail, including: a supporting bracket adapted to be fixed to the upper rail; an operating lever rotatably being connected to the supporting bracket and linked to the lock lever, and being capable of transmitting an operating force for releasing a restriction of the movement to the lock lever; and a torsion spring formed of a single wire member being connected to the supporting bracket and resiliently holding the operating lever; the supporting bracket including: a supporting wall portion which serves as a fulcrum of the rotation of the operating lever at an abutting portion of the operating lever with respect to an upper portion of the operating lever when the operating lever is inserted along the longitudinal direction of the upper rail; and a first side wall portion and a second side wall portion disposed on both sides of the operating lever in terms of the widthwise direction on the side of the lock lever with respect to the supporting wall portion in terms of the longitudinal direction of the upper rail, the torsion spring including: a first terminal portion adapted to be inserted through the first side wall portion; a first extending portion arranged between the first and second side wall portions and extending from a proximal end of the first terminal portion toward the lock lever side in terms of the longitudinal direction of the upper rail; a locked strip portion extending from a distal end of the first extending portion toward the second side wall portion side in terms of the widthwise direction of the upper rail and being locked on an upper portion of the operating lever; a second extending portion extending from a distal end of the locked strip portion toward the opposite side from the lock lever in terms of the longitudinal direction of the upper rail; a shaft portion bent from a distal end of the second extending portion and inserted through the second side wall portion, and serves as an axis of rotation of the first extending portion, the locked strip portion, and the second extending portion in cooperation with the first terminal portion; a locking portion folded back from a distal end of the shaft portion and inserted through the second side wall portion at a position different from the shaft portion, and adapted to cause the locked strip portion to generate an urging force for urging the upper portion of the operating lever downward; and a second terminal portion extending from a distal end of the locking portion and adapted to urge a lower portion of the operating lever upward on the lock lever side with respect to the supporting wall portion in terms of the longitudinal direction of the upper rail.

DESCRIPTION OF THE PREFERRED EMBODIMENTS

Figure 1:
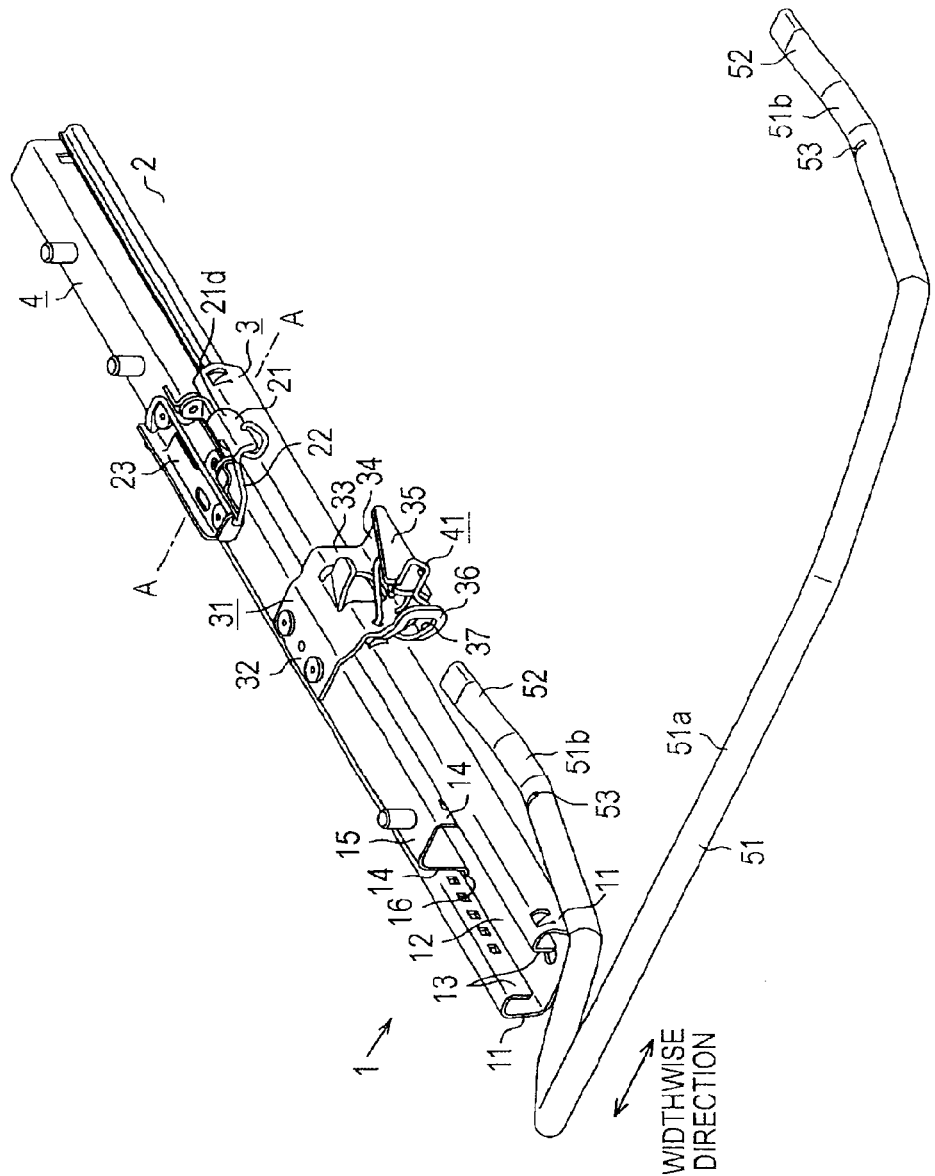
FIG. 1 is a perspective view showing an embodiment of the invention.

Referring now to the drawings, an embodiment in which the invention is embodied will be described below.

Figure 2:
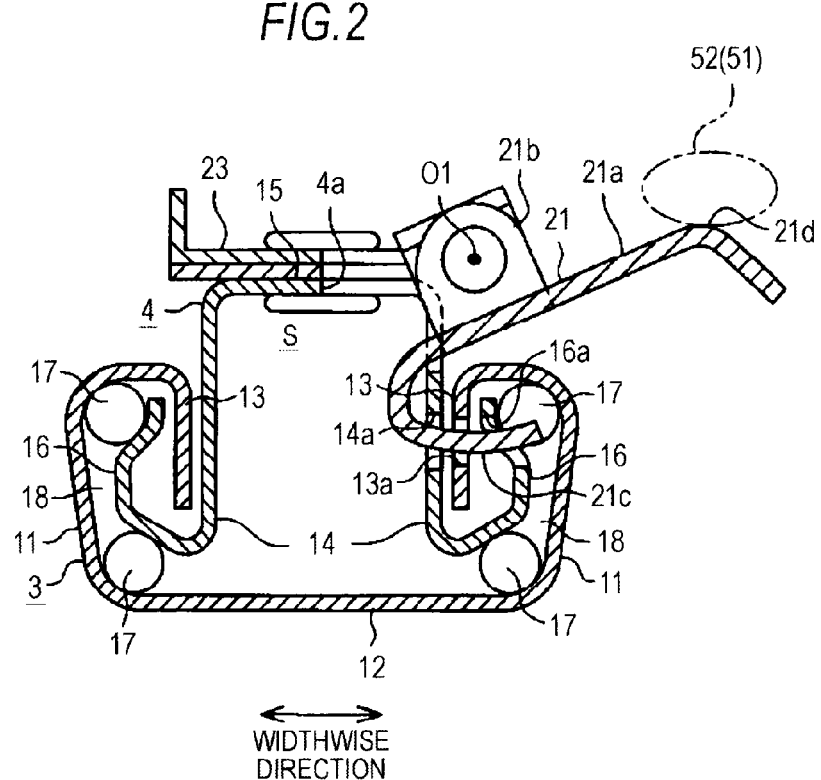
FIG. 2 is a cross-sectional view taken along the line A-A in FIG. 1.
Figure 7:
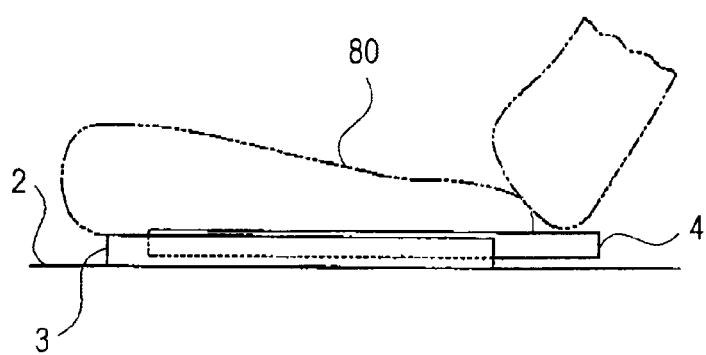
FIG. 7 is a schematically shown diagrammatic sketch of a first embodiment of the invention.

FIG. 1 is a perspective view showing a vehicle seat sliding apparatus 1 according to the embodiment which is mounted on a vehicle such as an automotive vehicle for example, and FIG. 2 is a lateral cross-sectional view taken along the line A-A in FIG. 1. As shown in FIG. 1, FIG. 2, and FIG. 7, a lower rail 3 is fixed to a vehicle-floor 2 in a state of extending in the fore-and-aft direction of the vehicle, and an upper rail 4 is mounted to the lower rail 3 so as to be movable relatively to the lower rail 3. A seat cushion 80 is fixed to the upper rail 4.

As shown in FIG. 2, the lower rail 3 includes a pair of side wall portions 11 extending upright from both sides thereof in terms of the widthwise direction and a bottom wall portion 12 connecting proximal ends (lower ends) of the side wall portions 11. Then, folded-back wall portions 13 which are formed to protrude inward in terms of the widthwise direction and then folded backward toward the proximal end sides of the side wall portions 11 are formed continuously from distal ends (upper ends) of the respective side wall portions 11.

In contrast, the upper rail 4 includes a pair of side wall portions 14 extending in the vertical direction between the both folded-back wall portions 13 of the lower rail 3 and a lid wall portion 15 connecting proximal ends (upper ends) of the side wall portions 14. Then, folded-back wall portions 16 which are formed to protrude outward in terms of the widthwise direction and then folded backward so as to be surrounded by the side wall portions 11 and the folded-back wall portions 13 are formed continuously from distal ends (lower ends) of the respective side wall portions 14.

In other words, the lower rail 3 and the upper rail 4 each include a U-shaped rail cross section with opening sides butted against to each other, and are held so as not to come apart from each other in the vertical direction mainly by the engagement of the folded-back wall portions 13, 16. The rail cross section formed by the lower rail 3 and the upper rail 4 assumes so-called a box shape in a rectangular shape. The lower rail 3 defines an internal space S in cooperation with the upper rail 4.

Retainers 18 adapted to hold pairs of rolling elements 17 arranged in the vertical direction are mounted between the respective folded-back wall portions 16 and the side, wall portion 11 opposing thereto, and the upper rail 4 is supported so as to be slidable in the longitudinal direction (the fore-and-aft direction of the vehicle) with respect to the lower rail 3 in a state of rolling the rolling elements 17 with respect to the lower rail 3.

Here, the folded-back wall portion 13 on one side of the lower rail 3 in terms of the widthwise direction (right side in FIG. 2) is formed with a plurality of lock holes 13a arranged crosswise at predetermined intervals over the substantially entire length of the longitudinal direction (the direction orthogonal to the paper plane) thereof. In contrast, a through hole 4a formed by removing a corner formed by the lid wall portion 15 and the side wall portion 14 on one side in terms of the widthwise direction (right side in FIG. 2) is formed at a center portion of the upper rail 4 in terms of the longitudinal direction, and the side wall portion 14 concerned is formed with a plurality of insertion holes 14a arranged crosswise on a lower portion thereof at the predetermined distances within a range of the through hole 4a in terms of the longitudinal direction and, in addition, the folded-back wall portion 16 which continued from the side wall portion 14 concerned is formed with the same number of insertion holes 16a as the insertion holes 14a arranged crosswise at the predetermined intervals. The plurality of insertion holes 14a, 16a are arranged so as to oppose to each other in terms of the widthwise direction at positions which can align with the same number of the lock holes 13a on the lower rail 3 adjacent to each other in terms of the longitudinal direction.

A lock lever 21 formed of a plate member is rotatably connected to the upper rail 4 via a bracket 23 within a range of the through hole 4a in the longitudinal direction. The lock lever 21 includes a flat panel-shaped body portion 21a and a pair of supporting strips 21b bent upward from both ends of a lower portion of the body portion 21a in terms of the longitudinal direction (the direction orthogonal to the paper plane) of the upper rail 4. The lock lever 21 is supported by the both supporting strips 21b so as to be rotatable about a revolving shaft O1 extending in the longitudinal direction of the upper rail 4 outside the internal space S. The lock lever 21 is formed with locking claws 21c formed from the body portion 21a so as to enter the interior of the internal space S through the through holes 4a and bent outward in terms of the widthwise direction by the same number as the insertion holes 14a or the like at the predetermined intervals. The respective locking claws 21c are arranged so as to be inserted into and pulled out from the insertion holes 14a, 16a in association with the rotation of the lock lever 21 about the axis of rotation O1.

When the respective locking claws 21c are inserted into the lock holes 13a as well as into the insertion holes 14a, 16a, the relative movement between the lower rail 3 and the upper rail 4 is restricted. Alternatively, when the respective locking claws 21c are pulled out from the insertion holes 16a, the lock holes 13a, and the insertion holes 14a in sequence, the relative movement between the lower rail 3 and the upper rail 4 is allowed.

A torsion wire 22 (see FIG. 1) formed of a single wire member is installed on an upper portion of the upper rail 4. The torsion wire 22 is locked at one end and the other end with the lock lever 21 and the bracket 23, respectively. The lock lever 21 is constantly urged in the direction of rotation on the side where the locking claws 21c are inserted into the insertion holes 14a and the like (the counterclockwise direction in FIG. 2) by the torsion wire 22.

In addition, the lock lever 21 is bent from an upper portion of the body portion 21a toward a distal and thereof so as to be inclined obliquely downward, and forms an abutting portion 21d on an upper surface of the bent portion concerned.

The vehicle seat sliding apparatus 1 includes the lower rails 3, the upper rails 4, and the lock levers 21 described above disposed in pair respectively in terms of the rail width direction, and a seat cushion which forms a seating portion of an occupant is fixed to and supported by the both upper rails 4. Therefore, when the relative movement between the upper rails 4 with respect to the lower rails 3 is restricted by the engagement between the locking claws 21c of the lock levers 21 and the lock holes 13a of the lower rails 3, the seat cushion is held at a predetermined position with respect to the vehicle-floor 2. Also, when the restriction of the relative movement is released by the release of the engagement between the locking claws 21c of the lock levers 21 and the lock holes 13a of the lower rails 3, adjustment in position of the seat with respect to the vehicle-floor 2 in the longitudinal direction of the upper rails 4 (the fore-and-aft direction of the vehicle) is allowed.

As shown in FIG. 1, a supporting bracket 31 formed of a plate member is fixed to the each upper rail 4 on one side (lower left side in FIG. 1) of the lock lever 21 in terms of the longitudinal direction. The supporting bracket 31 includes a mounting wall portion 32 extending in the widthwise direction of the upper rail 4 and being tightened to the lid wall portion 15, and also includes a first side wall portion 33 extending downward from a distal end of the mounting wall portion 32 outside the lower rail 3 in terms of the widthwise direction. The supporting bracket 31 includes a bottom wall portion 34 extending from a lower end of the first side wall portion 33 outward in terms of the widthwise direction of the lower rail 3, includes a triangle second side wall portion 35 extending upward from a distal end of the bottom wall portion 34, and further includes a supporting wall portion 36 extending from the end on one side (lower left side in FIG. 1) of the first side wall portion 33 outward in terms of the widthwise direction of the lower rail 3.

Figure 4A:
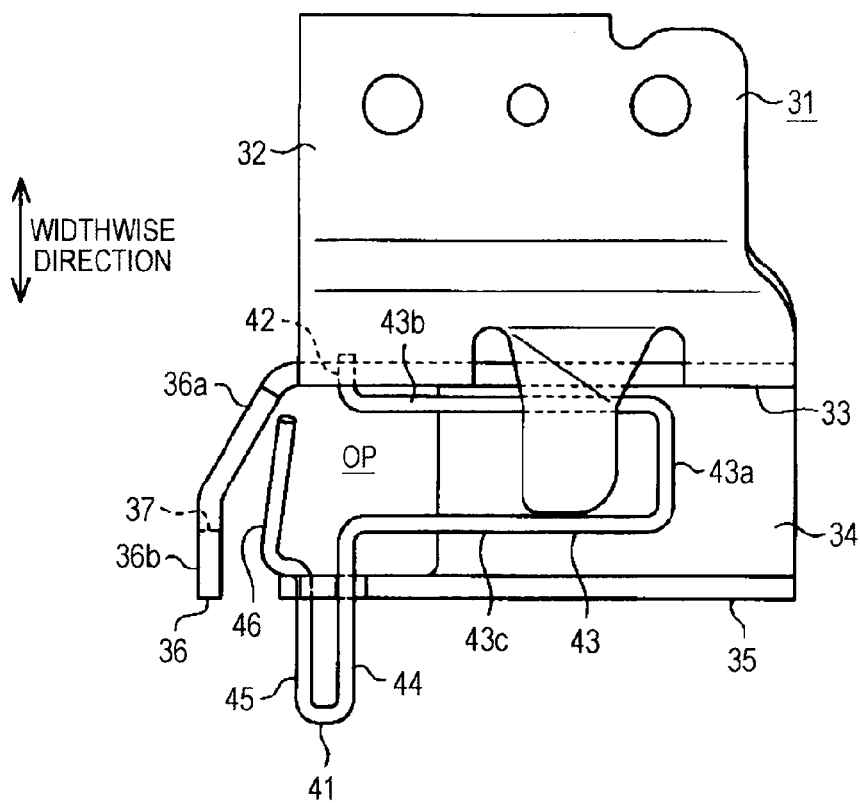
FIG. 4A is a plan view showing the same embodiment.

The first and second side wall portions 33, 35 are arranged in parallel to each other and apart from each other in the rail width direction (see FIG. 4A). Then, the second side wall portion 35 includes a projecting strip 35a at a distal end portion thereof on the side of the supporting wall portion 36, and includes a pair of groove portions 35b, 35c on the proximal side of the projecting strip 35a (see FIG. 4B). The directions of depression of the groove portions 35b, 35c are substantially orthogonal to each other. The bottom wall portion 34 connects lower ends of the first and second side wall portions 33, 35 on one side (right side in FIG. 4A) in terms of the longitudinal direction of the upper rail 4, and a range defined by the bottom wall portion 34 and the supporting wall portion 36 in plan view is an opening OP. In addition, the supporting wall portion 36 includes an inclined wall portion 36a which is displaced away from the first side wall portion 33 in the longitudinal direction of the upper rail 4 as it goes outward in terms of the widthwise direction of the upper rail 4 from one side end of the first side wall portion 33, and also includes a linear wall, portion 36b extending from a distal end of the inclined wall portion 36a in the rail width direction. Then, the supporting wall portion 36 is formed with a square insertion hole 37 opening in the longitudinal direction of the upper rail 4. The insertion hole 37 is formed so as to extend across the range of the inclined wall portion 36a and the linear wall portion 36b.

Figure 4B:
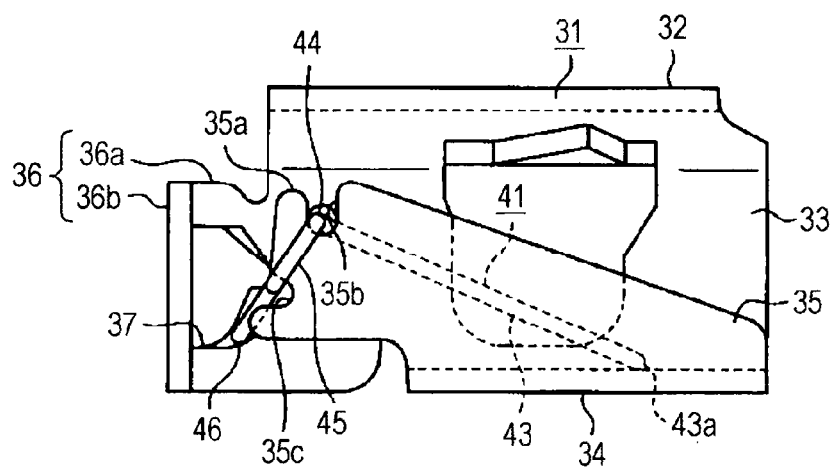
FIG. 4B is a side view showing the same embodiment.

As shown in FIGS. 4A and 4B, the supporting bracket 31 is attached with a torsion spring 41 formed of a single wire member. The torsion spring 41 includes a first terminal portion 42 extending in the rail width direction at a position of the opening OP and inserted into and locked by the first side wall portion 33, and also includes a first extending portion 43b being arranged between the first and second side wall portions 33 and 35 above the bottom wall portion 34 and extending from a proximal end of the first terminal portion 42 toward the lock lever 21 in the longitudinal direction of the upper rail 4, a locked strip portion 43a extending linearly toward the second side wall portion 35 in the rail width direction in a state of being bent from a distal end of the first extending portion 43b, and a second extending portion 43c extending toward the opposite side from the lock lever 21 in the longitudinal direction of the upper rail 4 in a state of being bent from a distal end of the locked strip portion 43a. The first extending portion 43b, the locked strip portion 43a, and the second extending portion 43c form so-called a hairpin-shaped extending portion 43. The torsion spring 41 also includes a shaft portion 44 which is bent from a distal end of the second extending portion 43c (the extending portion 43) at the position of the opening OP outward in the rail width direction and is inserted into and locked by the second side wall portion 35 so as to assume a state of being fitted into one of the groove portions 35b of the second side wall portion 35. The shaft portion 44 extends coaxially with the first terminal portion 42, and serves as an axis of rotation of the extending portion 43 (the first extending portion 43b, the locked strip portion 43a; and the second extending portion 43c) in cooperation with the first terminal portion 42. In addition, the torsion spring 41 includes a locked portion 45 which is folded backward from a distal end of the shaft portion 44, and is inserted into and locked by the second side wall portion 35 so as to assume a state of being fitted into the other groove portion 35c of the second side wall portion 35. The locked portion 45 twists the shaft portion 44 to cause the locked strip portion 43a to generate a downward urging force. Also, the torsion spring 41 includes a second terminal portion 46 extending from a distal end of the locked portion 45 at the position of the opening OP.

In an assembly step of the torsion spring 41, first of all, the first terminal portion 42 is inserted into the first side wall portion 33 in a state in which the extending portion 43 is arranged on the bottom wall portion 34, which is positioned between the first and second side wall portions 33 and 35. Then, when the projecting strip 35a is inserted between the shaft portion 44 and the locked portion 45 in this state, the shaft portion 44 and the locked portion 45 are fitted into the pair of groove portions 35b, 35c respectively while being broadened by the projecting strip 35a, so that the projecting strip 35a is resiliently clamped. Accordingly, the assembly work of the torsion spring 41 to the supporting bracket 31 is completed.

As shown in FIG. 1, an operating lever 51 formed by bending a tubular member is connected to the supporting bracket 31 on each side in the rail width direction. In other words, the operating lever 51 is formed into a U-shape having an operating portion 51a extending in the rail width direction, and a pair of distal end portions 51b bent respectively from both ends of the operating portion 51a toward the lock lever 21 in the longitudinal direction of the upper rail 4. Then, the operating lever 51 includes flat-shaped pressing portions 52 formed by collapsing the respective distal end portions 51b in the vertical direction and slit-like holding grooves 53 formed on the proximal side of the each flat-shaped pressing portion 52 so as to extend in the rail width direction by removing part of an upper portion thereof. The each holding groove 53 extends in the direction orthogonal to the direction of insertion of the operating lever 51.

Figure 3:
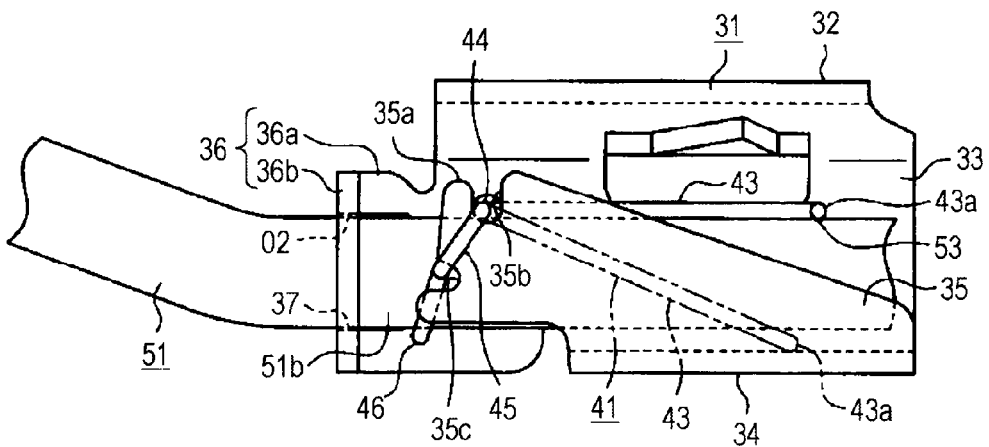
FIG. 3 is a side view showing the same embodiment.

The operating lever 51 is supported by the supporting wall portion 36 (the supporting bracket 31) by the each distal end portion 51b thereof being inserted into the insertion hole 37 of the supporting wall portion 36 along the longitudinal direction of the upper rail and is linked with the lock lever 21 by the each pressing portion 52 being placed on the abutting portion 21d of the lock lever 21 (see FIG. 2). At this time, as shown in FIG. 3, the extending portion 43 of the each torsion spring 41 is pressed against the distal end portion 51b (the pressing portion 52) of the operating lever 51 passing under the extending portion 43 along the bottom wall portion 34 between the first and second side wall portions 33 and 35, and hence is rotated upward (counterclockwise in the drawing) about the first terminal portion 42 and the shaft portion 44 against the urging force. Then, in association with the insertion of the each distal end portion 51b of the operating lever 51, when the holding groove 53 reaches the linear locked strip portion 43a which slides on an upper portion thereof, the locked strip portion 43a is fitted into the holding groove 53. Accordingly, the each distal and portion 51b of the operating lever 51 is locked and prevented from coming apart in a state in which an upper portion is urged downward in the holding groove 53 by the torsion spring 41 (the locked strip portion 43a). Needless to say, the locked portion 45 generates an urging force which urges an upper portion (the holding groove 53) of the operating lever 51 downward. In contrast, the second terminal portion 46 of the torsion spring 41 urges a lower portion of the each distal end portion 51b of the operating lever 51 upward at the position of the opening OP.

Then, the each supporting wall portion 36 (the insertion hole 37) serves as a fulcrum of the rotation of the operating lever 51 at the abutting portion of the operating lever 51 with respect to the upper portion of the distal end portion 51b. Therefore, the each supporting wall portion 36 supports the operating lever 51 so as to be rotatable about an axis of rotation O2 set at an abutment portion thereof with respect to the operating lever 51 (the upper portion of the distal end portion 51b). The reason why the fulcrum of the rotation of the operating lever 51 using the supporting bracket 31 (the supporting wall portions 36) is for balancing an operating force and an operating amount of the operating lever 51 required for releasing the lock lever 21 using the principle of a lever. It is needless to say that the direction of rotation of the operating lever 51 is different from the direction of rotation of the lock lever 21. The torsion spring 41 is adapted to hold the operating lever 51 resiliently for maintaining the linked state of the operating lever 51 with respect to the lock lever 21. Alternatively, a configuration in which the operating lever 51 is resiliently held so that the operating lever 51 releases the operating force for releasing the restriction of movement of the lower rail 3 and the upper rail 4 with respect to the lock lever 21 is also applicable.

In this configuration, it is assumed that the operating lever 51 is operated to lift the operating portions 51a, and the both distal end portions 51b of the operating lever 51 are rotated clockwise about the axis of rotation O2 in FIG. 3. At this time, the each pressing portion 52 of the operating lever 51 is moved downward in FIG. 2, and hence presses the abutting portion 21d of the lock lever 21 downward. Accordingly, the each lock lever 21 is rotated clockwise about the axis of rotation O1, that is, in the direction of rotation in which the locking claw 21c is moved away from the insertion hole 14a or the like against the urging force of the torsion wire 22. Accordingly, the restriction of the relative movement between the lower rail 3 and the upper rail 4 is released.

In contrast, when the operating force of the operating lever 51 (the operating portion 51a) is released, the lock lever 21 is urged by the torsion wire 22, and is rotated (backward) counterclockwise about the axis of rotation O1 in FIG. 2, that is, in the direction of rotation on the side in which the locking claw 21c is inserted into the insertion hole 14a or the like. Accordingly, the relative movement between the lower rail 3 and the upper rail 4 is restricted again. Also, the both distal end portions 51b of the operating lever 51 are rotated counterclockwise about the axis of rotation O2 in FIG. 3 in association with the movement of the lock levers 21.

As described above in detail, the following advantages are achieved according to this embodiment.

(1) In this embodiment, the torsion spring 41 can be assembled to the supporting bracket 31 easily and, simultaneously, prevented from coming apart by inserting the first terminal portion 42 through the first side wall portion 33, inserting the shaft portion 44 through the second side wall portion 35 (the groove portion 35b), and further inserting the locked portion 45 folded backward from the distal end of the shaft portion 44 through second side wall portion 35 (the groove portion 35c). In particular, since the torsion spring 41 is configured to be assembled to the supporting bracket 31 fixed to the upper rail, the assembly work of the torsion spring 41 is further simplified. Also, the axis of rotation O2 of the operating lever 51 can be set separately from the axis of rotation O1 of the lock lever 21 only by inserting the each distal end portion 51b of the operating lever 51 into the supporting wall portion 36. In other words, the direction of rotation of the operating lever 51 and the direction of rotation of the lock lever 21 can be set to be different from each other. In addition, the operating lever 51 can be urged in the vertical direction by the locked strip portion 43a (the extending portion 43) and the second terminal portion 46 with the single torsion spring 41, so that the operating lever 51 can be held stably.

(2) In this embodiment, when the projecting strip 35a of the second side wall portion 35 is inserted between the shaft portion 44 and the locked portion 45 of the torsion spring 41, the shaft portion 44 and the locked portion 45 are brought into a state of being fitted into the pair of groove portions 35b, 35c, and are connected to the second side wall portion 35 in a state of resiliently clamping a proximal end portion of the projecting strip 35a. In this manner, the shaft portion 44 and the locked portion 45 can be connected to the second side wall portion 35 with an extremely simple method such as to insert the projecting strip 35a therebetween.

(3) In this embodiment, since a transmitting member (a lever or the like) for changing the direction does not have to be provided separately between the lock lever 21 and the operating lever 51 even though the direction of rotation of the lock lever 21 is different from the direction of rotation of the operating lever 51, increase in number of components and number of assembly steps can be restrained.

The embodiment described above may be modified as follows.

Figure 5:
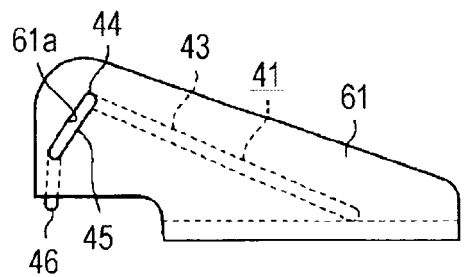
FIG. 5 is a side view showing a modification of the invention.

As shown in FIG. 5, a second side wall portion 61 having an elongated hole 61a which communicates at positions corresponding to the both groove portions 35b, 35c may be employed instead of the second side wall portion 35 having the projecting strip 35a and the pair of groove portions 35b, 35c. In this case, although the shaft portion 44 and the locked portion 45 of the torsion spring 41 are inserted into and locked by the same elongated hole 61a formed on the second side wall portion 61, since they are inserted through the positions different from each other, the same effects as in the embodiment described above is achieved.

Figure 6:
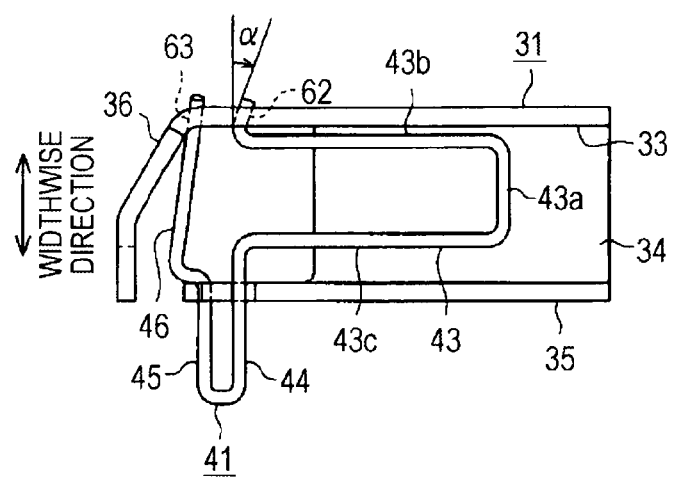
FIG. 6 is a plan view showing the modification of the invention.

As shown in FIG. 6, a first terminal portion 62 set to have a predetermined pressure angle α so as to be inclined with respect to the rail width direction (the axis of rotation of the extending portion 43) may be employed in the torsion spring 41. Then, by causing the first terminal portion 62 to generate an urging force to restrain the same from coming apart from the first side wall portion 33 by the setting of this pressure angle α, the first terminal portion 62 can be prevented from coming apart from the first side wall portion 33.

As also shown in FIG. 6, an extending portion 63 inserted into and engaged with the first side wall portion 33 may be provided on the second terminal portion 46. In this case, the second terminal portion 46 is supported at both ends thereof in a state of being bridged between the first and second wall portions 33 and 35, the operating lever 51 (the distal end portion 51b) can be urged and supported in a stable state.

Although the first side wall portion 33 and the second side wall portion 35 of the supporting bracket 31 are arranged on the side of the upper rail 4 and the opposite side thereof in the rail width direction respectively in the embodiment described above, the positional relation may be vice versa. In this case, the torsion spring 41 may be assembled basically in the reverse direction so as to match the relation of arrangement of the first and second side wall portions 33 and 35. The supporting wall portion 36 may be continued to the second side wall portion 35.

In the embodiment described above, the number of locking claws 21c to be provided on the lock lever 21 may be any number as long as there is at least one.

In the embodiment described above, the cross-sectional shape of the lower rail 3 is shown simply as an example. For example, the folded-back wall portions 13 may be protruded outward in terms of the rail width direction.

In the embodiment described above, the cross-sectional shape of the upper rail 4 is shown simply as an example. For example, the folded-back wall portions 16 may be protruded inward in terms of the rail width direction. The cross section of the upper rail 4 is not limited to the U-shape, but may be an inverted T-shape, for example.

The direction of movement of the seat in association with the movement of the upper rail 4 with respect to the lower rail 3 may be, for example, the fore-and-aft direction or the widthwise direction of the vehicle.

According to one embodiment of the invention, the torsion spring can be assembled to the supporting bracket easily and, simultaneously, prevented from coming apart by inserting the first terminal portion through the first side wall portion, inserting the shaft portion through the second side wall portion, and further inserting the locked portion folded backward from the distal end of the shaft portion through second side wall portion. Also, the axis of rotation of the operating lever can be set separately from the axis of rotation of the lock lever only by inserting the operating lever into the supporting wall portion. In this case, the direction of rotation of the operating lever and the direction of rotation of the lock lever 21 need not coincide with each other.

According to one embodiment of the invention, when the projecting strip is inserted between the shaft portion and the locked portion of the torsion spring, the shaft portion and the locked portion are brought into a state of being fitted into the pair of groove portions, and are connected to the second side wall portion in a state of resiliently clamping the projecting strip. In this manner, the shaft portion and the locked portion can be connected to the second side wall portion with an extremely simple method such as to insert the projecting strip therebetween.

According to one embodiment of the invention, since the pressure angle is set, the first terminal portion can be restrained from coming apart from the first side wall portion.

According to one embodiment of the invention, since the second terminal portion is supported at both ends thereof in a state of being bridged between the first and second wall portions, the operating lever can be urged and supported in a stable state.

According to one embodiment of the invention, since a transmitting member (a lever or the like) for changing the direction need not be provided separately between the lock lever and the operating lever even though the direction of rotation of the lock lever is different from the direction of rotation of the operating lever, increase in number of components and number of assembly steps can be restrained.

According to one embodiment of the invention, the vehicle seat sliding apparatus in which the assembleability of the torsion spring which resiliently hold the operating lever can be improved without being restrained in the direction of rotation of the operating lever.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus having a lower rail adapted to be fixed to a vehicle-floor, an upper rail adapted to be fixed to a seat cushion and connected to the lower rail so as to be movable with respect to the lower rail, and a lock lever rotatably connected to the upper rail and adapted to engage the lower rail to selectively restrict the movement of the upper rail with respect to the lower rail, the apparatus comprising:

a supporting bracket adapted to be fixed to the upper rail;

an operating lever rotatably being connected to the supporting bracket and linked to the lock lever, and being capable of transmitting an operating force for releasing a restriction of the movement to the lock lever; and a torsion spring formed of a single wire member being connected to the supporting bracket and resiliently holding the operating lever, the supporting bracket including:

a supporting wall portion which serves as a fulcrum of the rotation of the operating lever at an abutting portion of the operating lever with respect to an upper portion of the operating lever when the operating lever is inserted along the longitudinal direction of the upper rail; and a first side wall portion and a second side wall portion disposed on both sides of the operating lever in terms of the widthwise direction on the side of the lock lever with respect to the supporting wall portion in terms of the longitudinal direction of the upper rail, the torsion spring including:

a first terminal portion adapted to be inserted through the first side wall portion;

a first extending portion arranged between the first and second side wall portions and extending from a proximal end of the first terminal portion toward the lock lever side in terms of the longitudinal direction of the upper rail;

a locked strip portion extending from a distal end of the first extending portion toward the second side wall portion side in terms of the widthwise direction of the upper rail and being locked on an upper portion of the operating lever;

a second extending portion extending from a distal end of the locked strip portion toward the opposite side from the lock lever in terms of the longitudinal direction of the upper rail;

a shaft portion bent from a distal end of the second extending portion and inserted through the second side wall portion, and serves as an axis of rotation of the first extending portion, the locked strip portion, and the second extending portion in cooperation with the first terminal portion;

a locking portion folded back from a distal end of the shaft portion and inserted through the second side wall portion at a position different from the shaft portion, and adapted to cause the locked strip portion to generate an urging force for urging the upper portion of the operating lever downward; and a second terminal portion extending from a distal end of the locking portion and adapted to urge a lower portion of the operating lever upward on the lock lever side with respect to the supporting wall portion in terms of the longitudinal direction of the upper rail.

2. The vehicle seat sliding apparatus according to claim 1, wherein the second side wall portion includes:

a projecting strip formed at a distal end portion on the side of the supporting wall portion and adapted to be inserted between the shaft portion and the locking portion; and a pair of groove portions which allow insertion of the shaft portion and the locking portion into a fitted state in association with insertion of the projecting strip and allow the shaft portion and the locking portion to resiliently clamp the projecting strip.

3. The vehicle seat sliding apparatus according to claim 1, wherein the first terminal portion is set to have a pressure angle which is inclined with respect to an axis of rotation of the first extending portion, the locked strip portion, and the second extending portion to generate an urging force to restrain the same from coming apart from the first side wall portion.

4. The vehicle seat sliding apparatus according to claim 1, wherein the second terminal portion includes an extending portion to, be inserted through the first side wall portion.

5. The vehicle seat sliding apparatus according to claim 1, wherein the direction of rotation of the lock lever and the direction of rotation of the operating lever are different from each other.

* * * * *